UNITED STATES PATENT OFFICE.

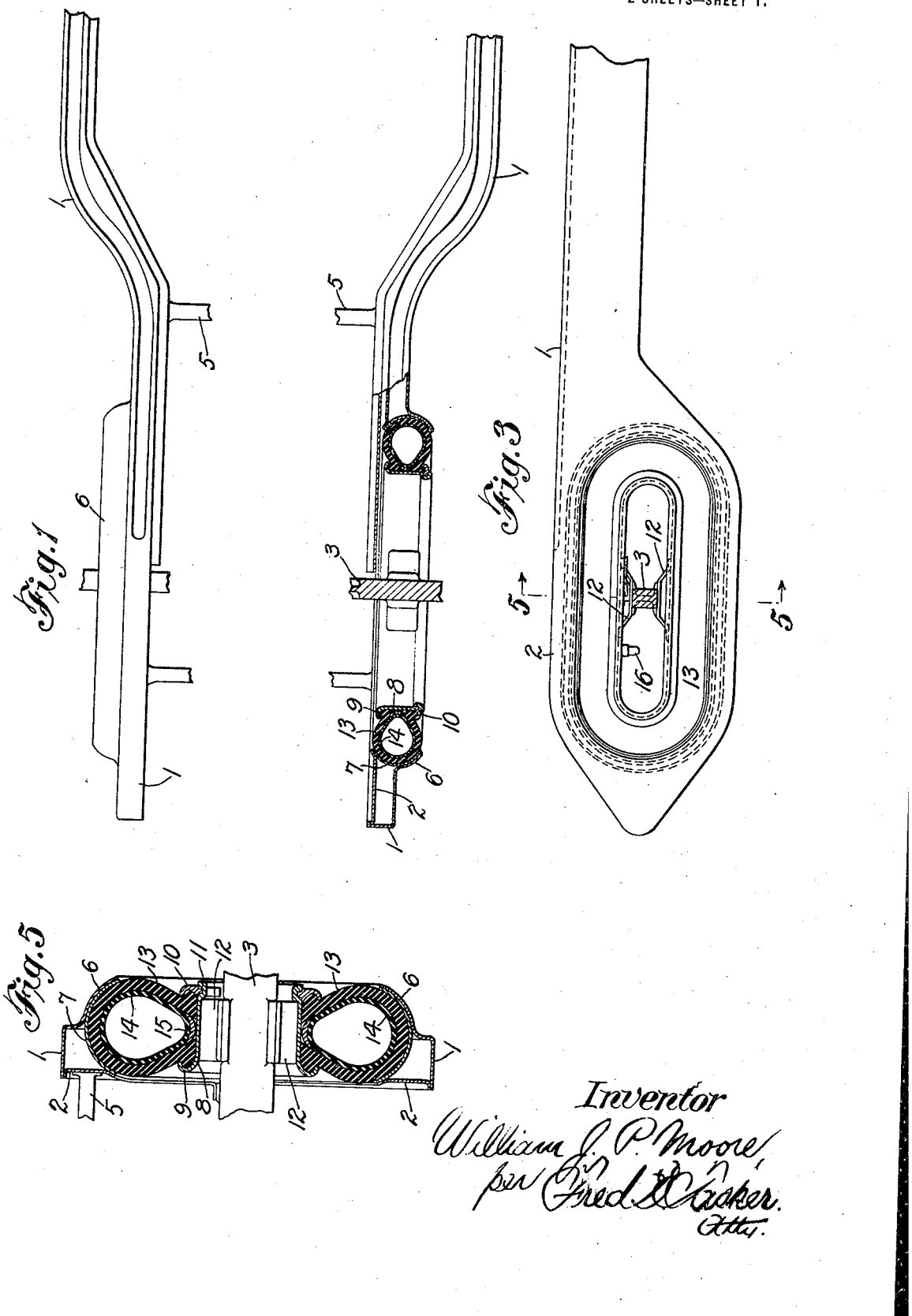

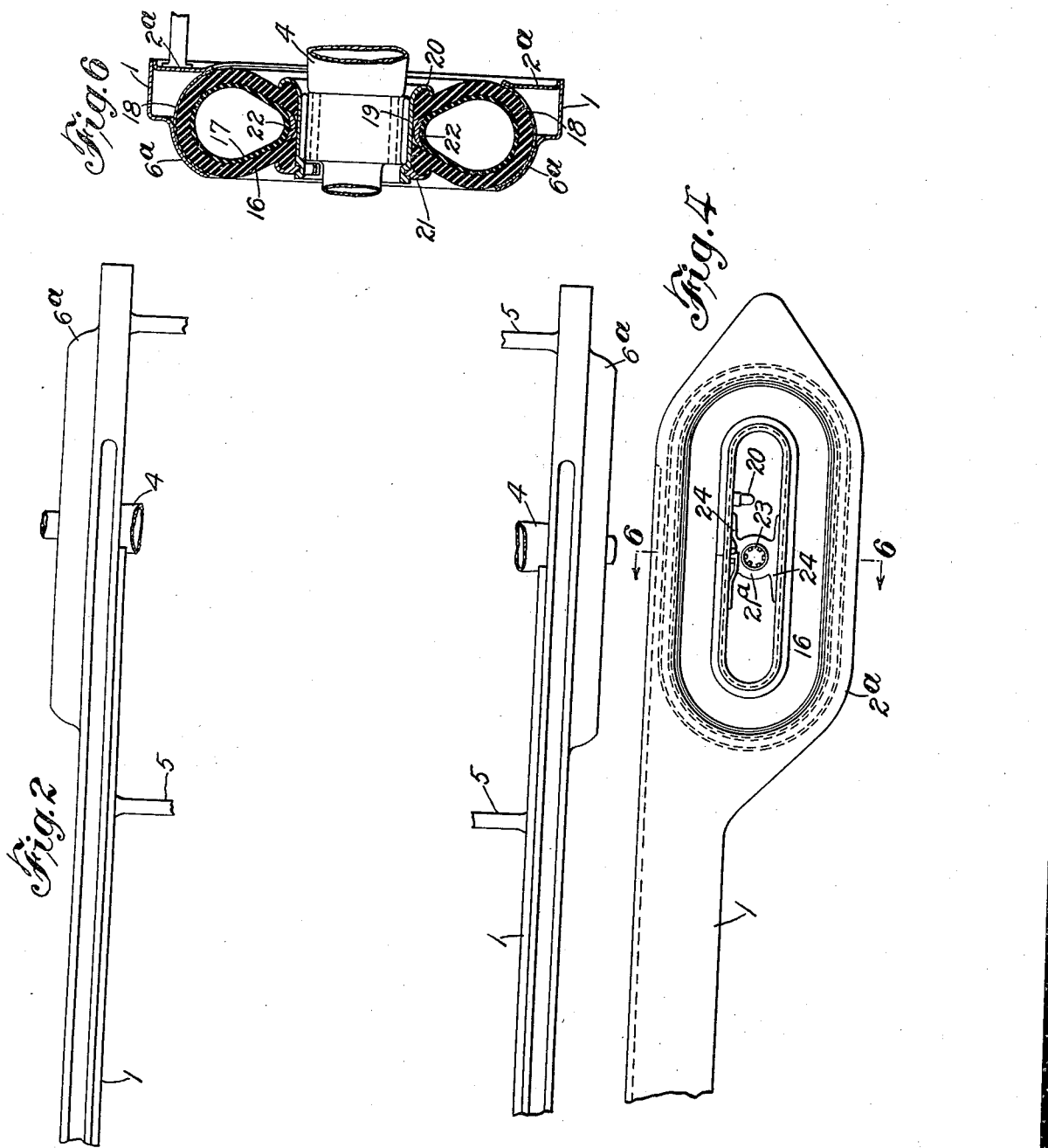

WILLIAM J. P. MOORE, OF NEW YORK, N. Y.

ELASTIC SUSPENSION DEVICE FOR THE FRAMES OF AUTOMOBILES AND OTHER VEHICLES.

1,243,752.

Specification of Letters Patent.  Patented Oct. 23, 1917.

Application filed January 3, 1916. Serial No. 69,827.

*To all whom it may concern:*

Be it known that I, WILLIAM J. P. MOORE, a citizen of the United States, residing at New York, in the county of New York and State of New York, have invented certain new and useful Improvements in Elastic Suspension Devices for the Frames of Automobiles and other Vehicles, of which the following is a specification, reference being had therein to the accompanying drawings.

This invention has to do with the flexible suspension of the frame and body of an automobile or other vehicle upon the axle and wheels thereof, and has for its object the substitution of an air cushion for metallic springs of all kinds, which cushion will be elastic and resilient so that the body of the vehicle will not sustain shocks or jars. Another object is to provide resilient members which will be more effective in use than springs, more durable, and more economical, besides producing better results in use inasmuch as they can be more readily repaired, or new ones substituted. The invention consists essentially in employing between the frame and the axle, both at the front and rear, suitable elastic cushions; also in using for this purpose hollow casings or shoes of rubber or other elastic fabric or material, within which are inflatable inner tubes which can be pumped full of air in the same manner that the inner tubes of tires are now commonly filled; and the invention furthermore comprises numerous details and peculiarities in the construction, combination and arrangement of the various parts, substantially as will be hereinafter described and then more fully pointed out in the claims.

In the accompanying drawing illustrating my invention:

Figure 1 is a plan view of the front end of a vehicle frame constructed and adapted for use with my improved pneumatic suspension means, one side of the frame being shown in horizontal section.

Fig. 2 is a plan view of the rear end of this frame which is broken away from the first part, as the entire frame could not be properly represented in the length of a single sheet.

Fig. 3 is a side elevation of that portion of the frame represented in Fig. 1.

Fig. 4 is a side elevation of the portion of the frame shown in Fig. 2.

Fig. 5 is a vertical section on an enlarged scale on the line 5, 5 of Fig. 3.

Fig. 6 is a similar vertical section on the line 6, 6 of Fig. 4.

Similar characters of reference designate corresponding parts throughout the different figures of the drawing.

1, 1 denote the sides of the main frame as shown in Fig. 1. These sides have parallel parts which merge through a slight curve into the other parallel parts which extend to the opposite end of the frame as shown in Fig. 2. The sides 1, 1 may partake of any desired form and design, but they will usually be made of some light metallic construction which will be stiff and durable and of proper dimensions and shape to easily hold within it the resilient cushioning devices which form the essential features of the invention. On the ends the elongated sides 1, 1 are preferably widened vertically at 2 in the front and at $2^a$ in the rear to afford structures which will contain the air cushions in the form of tubes, or otherwise, and through which may pass the axles of the car. 3 denotes the front axle, and 4 the rear axle. These elongated sides are tied together or connected in any desired manner, as for instance by the cross-struts or tie rods 5 placed at intervals at the front and rear.

Referring now to the front end of the frame shown in Figs. 1, 3 and 5, it will be seen that the sides 2 which are preferably wider opposite to the axle are provided with lateral oval flanges 6, within each of which is preferably an elliptical or oval-shaped band or ring 7 (although it may have any other shape) having a curved cross-section (see Fig. 5) which bands may be of greater or less width and curvature, and which are welded or otherwise firmly secured to the flanges 6 and to the enlarged sections 2 of the side 1. The bands or rings 7 provide therefore portions of the frame which receive and support the inflated rubber member or members by means of which the pneumatic suspension effect is secured.

Inside of each ring 7 and parallel thereto at top and bottom and concentric therewith so far as the curved parts are concerned, is the smaller oval-shaped ring 8, similar in purpose to a clencher rim and having an integral flange 9 at one side and a detachable ring 10 at the other side which is seated in a groove 11 in the outer edge of the ring 8. This oval clencher ring is secured to the axle 3 by means of intervening angle plates 12 which are welded or otherwise secured to the ring 8 and also to the axle 3 as shown in Fig. 3.

Between each ring 7 and its companion clencher band 8 is the oval casing or shoe 13, and inside of it is an inflatable inner tube 14. This tube 14 is provided with any suitable air valve of the various well known types, as indicated at 16; also, I find it convenient to use a strip of rubber or fabric, as shown at 15, to fill the space between the flanges of the shoe 13 and between the inner tube and said flanges as shown in Fig. 5. The inner tube may be omitted at times and simply an endless tube or rod of elastic material used, which may have any shape.

At the other end of the frame the construction and arrangement of the parts are substantially the same as I have already described and the pneumatic suspension means is similarly arranged and combined. Referring to Figs. 2, 4, and 6, it will be seen that the enlarged end 2ª of the main frame 1 is provided with a lateral curved oval flange 6ª similar to the flange 6 in the other figures of the drawing, and that beneath the flange 6ª within the frame 1 and adjacent to the member 2ª is located an oval or elliptical ring or member 18 which is similar to the member 7 in the other figures of the drawing, the same being designed to receive within it a shoe 16 similar to the shoe or casing used with automobile tires, within which shoe is an inflatable tube 17, which when inflated binds the shoe or casing 16 tightly against the oval member 18 and also holds it firmly in the central oval band or member 19, which is parallel or concentric with the oval member 18, having at one edge an integral curved flange 20 and at the other a detachable ring 21, between which flange 20 and ring 21 the side flanges of the shoe 16 are firmly held. Any kind of an air valve as indicated at 20 may be used with the inner tube 17; and I also find it convenient to employ a strip of rubber or fabric 22 between the flanges of the shoe and between the inner tube and said flanges, so as to fill up the space and hold the parts together in better form. The inner member or rim 19, which is in effect a clencher rim having a flange and a detachable ring, is welded or otherwise firmly secured to a casting 21ª having preferably a splined or grooved opening 23 which receives the axle 4. The casting 21ª is made in any preferred form, but customarily is shaped with projections which lie flat against the member 19 and are welded thereto as already stated.

It will thus be seen that between the axle and the body of the vehicle, which body is mounted on the frame 1, 1, I interpose filled receptacles in lieu of metallic springs, which receptacles have an elasticity and flexibility which is superior to ordinary springs, and are more durable, cheaper, simpler in arrangement, and less likely to break when the vehicle encounters violent shocks against stones or deep ruts in the road. When once the inner tube is inflated it will remain so, unless the air valve should leak, of which there is very little danger, but in case of any leakage taking place through the valve or possibly through the material of the rubber or fabric, of which the tubes and shoes are composed, all that is required is simply to attach a pump and fill the inner tube with additional pressure to supplement the loss. A collapse of the inner tube through the entire loss of its air would involve no disaster to the structure of the vehicle, but would require only a pumping up of the tube. Unlike the situation of the parts of a tire which are exposed to punctures and blow-outs and other dangers on the road, there is nothing of this kind which can possibly affect the parts of a pneumatic suspension which is inclosed and protected by the frame as mine are and sheathed by the metallic encircling rings 7 and 18 so that I secure in a yielding body support, as it were, all the advantages which are usually gained by the wheel in the use of inflated tires without running the risk of any of the disadvantages and accidents.

Many changes in the precise construction and arrangement of the parts may be made without exceeding the scope of the invention, and I therefore, reserve the liberty of varying and modifying the details of said invention in the great variety of cases where it is applicable provided I do not go beyond the scope of the claims.

Having thus described my invention, what I claim as new and desire to secure by Letters Patent, is:

1. In a vehicle frame, the combination of apertured side members having lateral flanges, an axle, sheaths secured to the flanges and to the frame within the openings, bands surrounding the axle at a distance from the sheaths, and inflated cushions between the bands and sheaths consisting of an outer casing and an inner inflatable tube.

2. In a vehicle frame, the combination of side members having openings therein and lateral oval flanges encircling said openings, an axle passing through the openings, oval sheaths secured to the flanges and to the frame within the openings, correspondingly-shaped bands surrounding the axle at a distance from the sheaths, and inflated cushioning devices between the bands and sheaths consisting essentially of an outer casing and an inner inflatable tube.

3. In a vehicle frame, the combination of side members having openings therein and lateral endless flanges encircling said openings, an axle passing through the openings, a bearing for said axle, an endless sheath secured within each opening and supported by the flange, an endless band surrounding the axle at a distance from each of the sheaths, and cushioning devices between the bands and sheaths consisting of endless members which are closely held in place.

In testimony whereof I affix my signature.

WILLIAM J. P. MOORE.